Feb. 21, 1956   P. A. HAGEN   2,735,915
TOOL LIFE INDICATORS

Filed Jan. 10, 1955   2 Sheets-Sheet 1

INVENTOR.
PAUL A. HAGEN
BY Bruno C. Lechler
Attorney

Feb. 21, 1956

P. A. HAGEN 2,735,915

TOOL LIFE INDICATORS

Filed Jan. 10, 1955

INVENTOR.
PAUL A. HAGEN
BY
Bruno C. Lechler
Attorney

United States Patent Office 2,735,915
Patented Feb. 21, 1956

2,735,915

TOOL LIFE INDICATORS

Paul A. Hagen, Baraboo, Wis., assignor to Hagen Manufacturing Company, Inc., Moline, Ill., a corporation of Illinois Application January 10, 1955, Serial No. 480,781

7 Claims. (Cl. 200—153)

The invention relates to a device that closes a circuit, or opens a circuit, when a tool has completed a specified number of operations. This circuit may be used to control the operation of the machine, or a production line, or which the tool is a part.

The tool life indicator can be set for the number of operations that a given tool can be counted upon performing without loss of size or finish due to tool wear. The number of operations will of course vary with the type and size of the tool.

In tool life indicators hitherto known, as a piece moved into position for the tool to perform its function or out of position after the tool has performed its function, a synchronous motor was caused to run for a short period and this motor actuated the tool life indicator. If the piece should move slower than usual the synchronous motor might run longer giving a wrong indication.

The invention, by contrast, provides an apparatus that contains a solenoid that responds to a circuit that is closed every time the tool performs its task, such as by the actuation of a switch as a piece on which the tool acts moves into or out of the machine tool station.

When the tool has been installed in the machine, a handle is turned to a point indicative of the number of operations that the particular tool is to perform. Then, each time the tool performs its function, the apparatus steps the handle back one step toward its initial position. Some time before the handle reaches its initial position a cam connected with the handle closes or opens a circuit that gives a warning that the tool will soon need attention.

The handle then continues to move until it reaches its initial position when another circuit is closed or opened. This circuit will either give a second warning that the tool must be changed at once or, if desired, the circuit can open the switch that controls the operation of the machine tool that carries the tool, or the entire production line containing that tool.

The operator, when the production line is shut down, replaces the tool and also notes where the first signal has been given for any other tool. If so, he changes that tool also, even though it has not run its full life. Then he turns the handle of each tool life indicator whose tool has been replaced through its full range.

One of the novel features of this tool life indicator is that it permits the operator to correct the tool life while the indicator is in operation. Thus, by way of illustration, suppose there are a number of small drills whose life has been assumed to be 1000 operations. The stop which limits the angle through which the handle can be turned has been set for 1000 operations. The operator finds, when the tool life indicators for two drills have shut down the production line that the drills are still in good condition and that a reasonable life for this tool is 1500 operations, not 1000. In that event he can reset the tool life indicator stops for the other drills even though the production line is in operation and even though those tool life indicators have covered part of their range. Thus if the indicator indicates that the original estimated tool life of 1000 has been reduced to 750 by 250 operations, he can reset the stop on that tool life indicator to 1500 by pushing a button to release the stop and then, releasing the button, turning the handle back 500 steps to 1250. The tool life indicator will now allow about 1250 more pieces to be drilled by the tool before the production line is shut down.

The object of the invention is to provide a compact apparatus that can readily be set to close or open a circuit either controlling the automatic operation of a machine tool or to give a signal to the operator, when as many pieces have been processed as the tool will safely process without attention.

A further object is to provide a tool life indicator whose setting can be changed after a portion of the tool life has been exhausted.

A further object is to provide such a device incorporating a novel ratchet actuating carriage that is moved by a solenoid.

A further object of the invention is to provide a novel means for setting the number of actuations before the timer gives a signal.

Various other novel features will become obvious from the description.

In the form of the invention here used to illustrate the invention, a face-plate 1 is connected by columns 2 to plates 3, 4, 5 and the mechanism is shielded from dirt or injury by an external removable cover 6.

Figure 5:
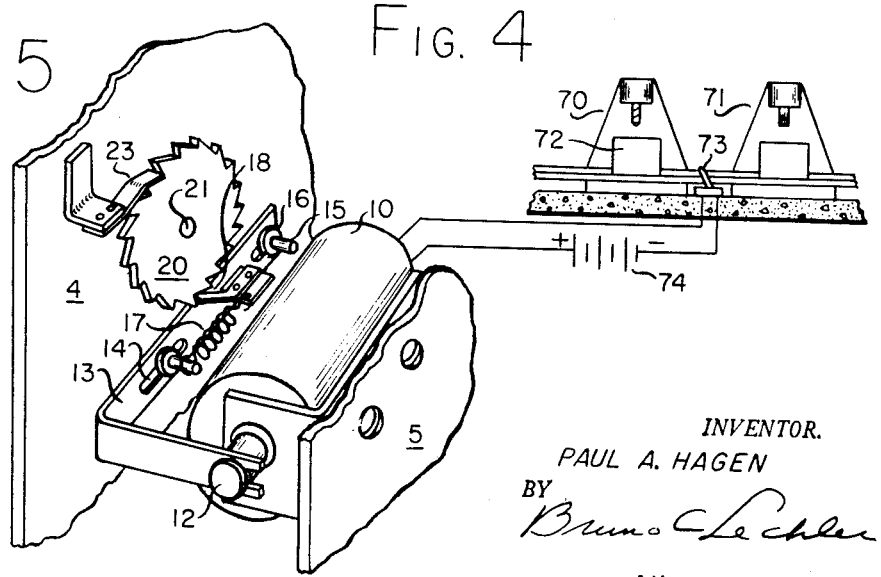
Figure 5 is a perspective showing a slider that is shown, in part, in Figure 4 which moves the ratchet-wheel.

The tool life indicators may be used in connection with a machine tool, or plurality of tools, such as 70 and 71 diagrammatically indicated in Figure 5.

The work pieces 72 are usually moved on a conveyor that carries them from one work station at one tool to the work station at the next tool.

In passing from one work station to the next the piece 72 may close a switch 73. This allows current from a power source 74 to flow to the solenoid in the tool life indicator.

The mechanism counts the number of actuations of the solenoid 10 in response to switch 73. The solenoid is carried by a bracket 11 attached to the plate 5.

At each actuation of the solenoid the armature 12 is drawn into the solenoid. The solenoid has a collar into which the prongs of a bent slider 13 fit. This slider has two slots 14. Studs 15 attached to plate 4 extend through these slots. Each stud carries a collar 16 that limits the movement of the slider to a lineal movement in contact with the plate 4. A spring 17 attached to one of said studs and to the slider draws the slider into a position that carries the armature back out of the solenoid.

The slider carries a spring pawl 18 that engages the ratchet teeth of ratchet wheel 20 when moving in one direction. The ratchet wheel is carried by a shaft 21 that extends through a bearing sleeve 22 carried by the plate 4. The plate 4 also carries a pawl 23 that engages the ratchet wheel and prevents the ratchet wheel turning backward.

It will be clear that the pinion 24 carried by shaft 21 will make one revolution when the solenoid 10 has received as many impulses as the ratchet wheel 20 has teeth.

Figure 3:
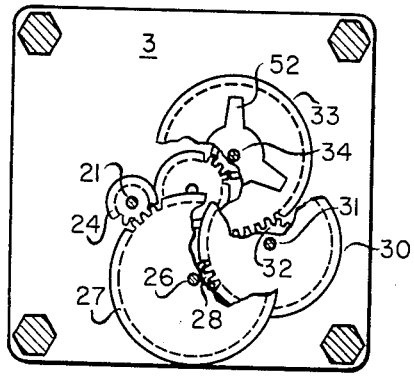
Figure 3 is a vertical cross section of the apparatus taken along lines 3—3 in Figure 2.
Figure 6:
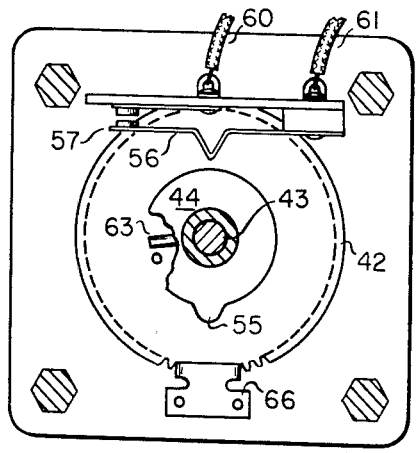
Figure 6 is a vertical section along lines 6—6 in Figure 2 showing the means for changing the adjustable stop.
Figure 4:
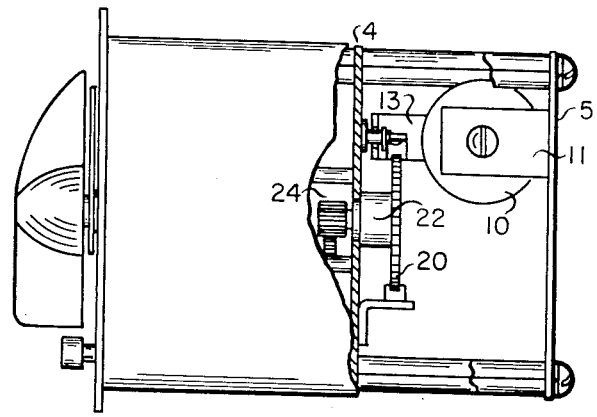
Figure 4 is a partial vertical section taken along lines 2—2 of Figure 1 showing mechanism located in the rear portion of the apparatus.

Figure 3 shows a gear train carried by plate 3 in which pinion 24 turns a shaft 26 carrying a meshing gear 27 and a pinion 28. Shaft 26 is supported in holes in plates 3 and 4.

The pinion 28 meshes with a gear 30 carried by a shaft 31 also supported in plates 3 and 4. This shaft carries a pinion 32 that meshes with a gear 33 turning freely on shaft 34.

It will be clear that the sole function of shafts 26, 31 and the gears and pinions carried thereon is to increase the number of actuations of the solenoid 10 required to turn the gear 33 through one turn. In this manner one turn of shaft 24 may correspond to several thousand actuations of the solenoid. The number of steps in this gear reduction may be made larger or smaller by adding or subtracting to the number of shafts such as 26, 31.

The face-plate 1 carries a sleeve 40 to which are attached pointer 41 on the outside of the plate and gear 42 on the inside of the plate. A shaft 43 extends through this sleeve. This shaft carries handle 47 and gear 46. Two cams 44, 45 are mounted on this shaft. Each cam has a sleeve that can be locked in a selected angular position by a set screw 48. The gear 46 meshes with a pinion 50 on shaft 34. This shaft has a collar 51. A spring having fingers 52 bears against this collar 51 and the gear 33.

Figure 1:
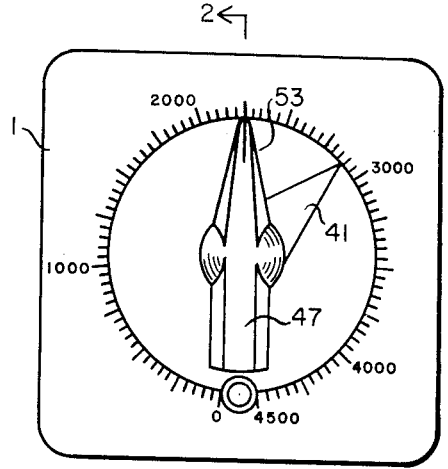
Figure 1 is a front elevation of one form of the invention.
Figure 2:
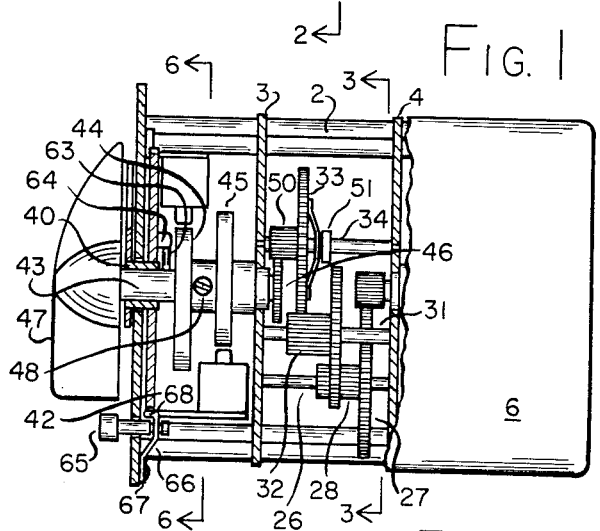
Figure 2 is a partial vertical section taken along lines 2—2 of Figure 1 showing mechanism located in the forward portion of the apparatus.

This provides a friction drive whereby the solenoid 10 may, through the gear train described and gear 33, turn the shaft 43 and thus move the handle 47 so that its point 53 is moved counterclockwise in Figure 1, but if the point 53 comes to rest against a stop, or if the handle 47 is turned clockwise, the spring fingers 52 allow the shaft 34 to remain at rest or be turned while the gear 33 is being turned by the solenoid 10 in the manner described.

Each of the cams 44, 45 carries a raised portion 55 that will at some point of the rotation of shaft 43 engage a spring 56 that will close a switch 57 that closes a circuit. Thus cam 44 closes a circuit through lines 60, 61. Cam 45 closes a similar switch controlling another circuit. It is obvious that there can be more or less than two cams 44, 45 each adapted to close or to open a different circuit.

These circuits may control any device that is to be actuated, or brought to rest, after a particular number of actuations of the solenoid 10. Thus if the handle 47 is turned to bring the point 53 in Figure 1 to 4000 and the cam 44 is properly adjusted by set screw 48, the switch contacts 57 will close when the solenoid 10 has been actuated 4000 times. This circuit could be arranged to stop a machine, or a series of machines successively operating on the same pieces of material, when some tool has been run as long as it can be depended upon to produce an accurate job taking into account the wear and tear on the tool each time it operates on a piece.

If the tool is a delicate one, the handle 47 is turned to some lower value such as 1000.

The other circuit controlled by cam 45 may be adjusted to give a signal shortly before the cam 44 closes circuit 60, 61. By way of illustration, a motor block may be operated on at successive stations by ten different tools, each having its own timing unit, and each set to stop the line at the end of a run of different length. To avoid needless shut downs, if the line has been shut down by the cam 44 of a timer connected with the fourth tool, and the sixth tool timer is already giving an indication through its cam 45 that the timer for the sixth tool will soon shut down the line, it is expedient to change both the fourth and sixth tool and reset both timers.

The number of actuations of the solenoid 10 to shut down the timer is determined by the angle through which the handle 47 is turned. This handle carries a pin 63 that engages a stop 64 carried by the gear 42. The angle through which the handle 47 can be turned is varied by changing the positions of the stop 64. This may be done by pressing the button 65, then moving stop-indicating pointer 41. The button 65 bears against a spring 66 on the back of plate 1. This spring, fastened to the plate at 67 has a finger 68 engaging one of the teeth of gear 42. When finger 65 is pressed, the finger 68 is removed from the gear and the gear is free to be turned by moving pointer 41. It will be understood that the button 65 will only be used to set the pointer 41 to a position that indicates a different number of operations the particular tool is to perform without regrinding or other attention than it has been previously performing. In the normal operation the operator of the machine merely turns the handle 47 as far as it will go whenever the tool has been replaced and the machine is ready to start up.

It will be noted that if the handle 47 has been turned until the pin 63 engages the stop 64 and the indicator has partly carried the handle 47 back to its initial position if the indicator is to be reset it can be done without waiting until the handle reaches its initial position.

The invention, it will be seen, includes a scale on which the number of actuations of an electric circuit are indicated. While the scale shows the number of actuations of a circuit, it will also indicate the number of times anything that takes place at each actuation of the circuit happens. In the example chosen to illustrate the invention, a tool performed its appointed function every time a circuit was actuated. The number of times the tool operated was therefore indicated. However, the actuation of the circuit could have been used to indicate the closing of a door or any other type of operation that puts current on a circuit.

The invention further provides an adjustable indicator that can be set to indicate the number of impulses that are to be counted before something else is to happen and each impulse moves a handle back one step from that indicator position toward the zero position. When the handle approaches the zero position, cams moving with the shaft close switches in circuits that may be used for any desired purpose.

It is obvious that the invention is not limited to tool life indicators but is applicable to any use wherein impulses are to be counted and, upon completion of a given number of impulses, some act is to be accomplished.

The plurality of cams, each actuating a switch, has been illustrated by two cams 44 and 45. It is clear that the number of cams and cam controlled switches is not limited to two.

I claim:

1. A tool life indicator comprising, in combination, an element responsive to the passage of a piece through the station where the tool operates on the piece, a shaft turned through a small increment by said element upon each passage of a piece through said station, a second shaft manually movable by a handle, a friction clutch between said two shafts, a movable stop limiting the angle through which said handle may be manually turned when a new tool is installed, a device to lock the stop in a fixed angular position, means to release said lock so that the stop may be reset by hand, a switch actuated by said second shaft when the element has turned the second shaft back to its initial position through said friction clutch.

2. A tool life indicator comprising, in combination, an element responsive to the passage of a piece through the station where the tool operates on the piece, a shaft turned through a small increment by said element upon each passage of a piece through said station, a second shaft manually movable by a handle, a friction clutch between said two shafts, a pin carried by said second shaft, a disc freely movable about said shaft carrying an abutment which the pin may engage, locking means normally preventing the disc from turning, means permitting the operator to disengage said locking means when resetting the stop, a switch actuated by said second shaft when the element has turned the second shaft back to its initial position through said friction clutch.

3. A tool life indicator comprising, in combination, an element responsive to the passage of a piece through the station where the tool operates on the piece, a shaft turned through a small increment by said element upon each passage of a piece through said station, a second shaft manually movable by a handle, a friction clutch between said two shafts, a stop limiting the angle through which said handle may be manually turned when a new tool is installed, a plate having a hole through which said second shaft passes, a dial on said plate indicating the number of operations the tool can still perform, a movable stop limiting the movement of said handle along said dial, means permitting release of said stop to be manually moved by said handle while the indicator is in operation, a switch actuated by said second shaft when the element has turned the second shaft back to its initial position through said friction clutch.

4. A device actuating a circuit after a preselected number of impulses have been received comprising, in combination, means responsive to each impulse, a shaft turned through a small angle by said means in responding to each impulse, a second manually rotatable shaft carrying a knob, a transmission including a friction clutch connecting said first and second shafts, a movable stop limiting the angle through which the second shaft can be turned by the knob, a device adapted to lock said stop in a given position, means to release said stop so that the position of said stop may be changed manually, a switch in a circuit that is actuated by said second shaft when the transmission in response to impulses has restored the second shaft to its initial position.

5. A device actuating a circuit after a preselected number of impulses have been received comprising, in combination, means responsive to each impulse, a shaft turned through a small angle by said means in responding to each impulse, a second manually rotatable shaft carrying a knob, a transmission including a friction clutch connecting said first and second shafts, a pin carried by said second shaft, a disc freely movable about said shaft carrying an abutment which the pin may engage, locking means normally preventing the disc from turning, means permitting the operator to disengage said locking means when resetting the disc, a switch in a circuit that is actuated by said second shaft when the transmission in response to impulses has restored the second shaft to its initial position.

6. A device actuating a circuit after a preselected number of impulses have been received comprising, in combination, means responsive to each impulse, a shaft turned through a small angle by said means in responding to each impulse, a second manually rotatable shaft carrying a knob, a transmission including a friction clutch connecting said first and second shafts, a plate having a hole through which said second shaft passes, a scale on said plate on which the second shaft indicates the number of impulses that must still be received before a circuit is closed, a movable stop limiting the angle through which the second shaft can be turned by the knob, means to lock said stop in a selected position, means permitting release of said lock to allow the movable stop to be manually reset while the impulse responsive means is in operation, a switch actuated by said second shaft when the impulse responsive means has turned the second shaft back to its initial position by means of said friction clutch.

7. A device actuating a circuit after a preselected number of impulses have been received comprising, in combination, means responsive to each impulse, a shaft turned through a small angle by said means in responding to each impulse, a second manually rotatable shaft carrying a knob, a transmission including a friction clutch connecting said first and second shafts, a plate having a hole through which said second shaft passes, a scale on said plate on which the second shaft indicates the number of impulses that must still be received before a circuit is closed, a movable stop limiting the angle through which the second shaft can be turned by the knob, means to lock said stop in a selected position, means permitting release of said locking means to allow the movable stop to be manually reset while the circuit actuating device is in operation, a cam carried by said second shaft, a switch actuated by said cam when the second shaft has turned back to its initial position by means of said friction clutch, a second cam carried by said second shaft, a second switch actuated by said cam shortly before said first switch is actuated.

References Cited in the file of this patent
UNITED STATES PATENTS
2,653,205   Kellenbenz _____ Sept. 22, 1953